UNITED STATES PATENT OFFICE.

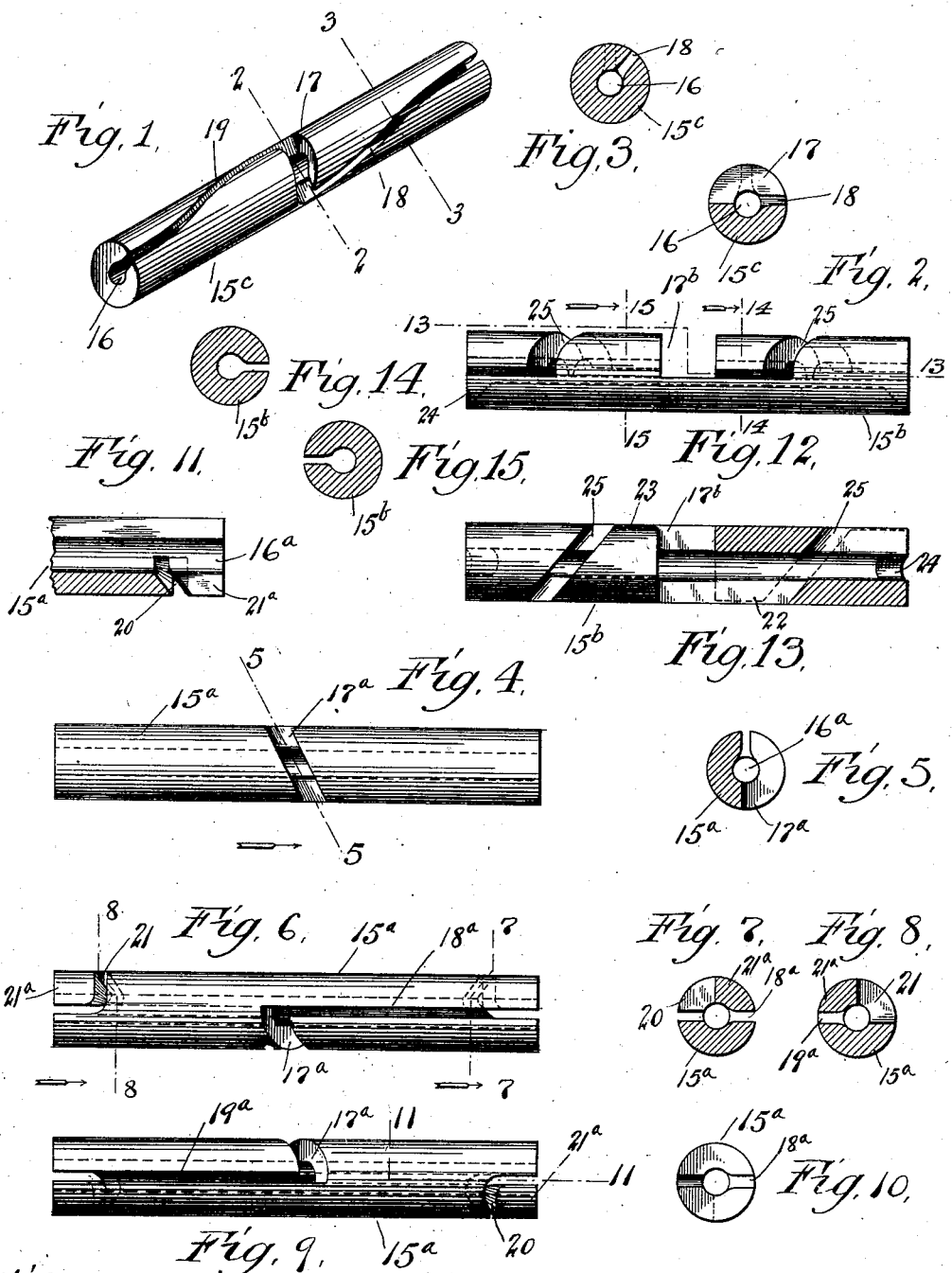

EDGAR J. STEWART, OF CHICAGO, ILLINOIS.

PACKAGE-CARRIER.

SPECIFICATION forming part of Letters Patent No. 709,936, dated September 30, 1902.

Application filed January 22, 1902. Serial No. 90,791. (No model.)

*To all whom it may concern:*

Be it known that I, EDGAR J. STEWART, a citizen of the United States, and a resident of Chicago, county of Cook, and State of Illinois, have invented certain new and useful Improvements in Package-Carriers, of which the following is a specification and which are illustrated in the accompanying drawings, forming a part thereof.

My invention relates to a handle which is designed to be applied to or placed on the cord or string securing a package to facilitate the carrying of the latter.

The object of the invention is to provide a simple and inexpensive device of the character referred to which may be readily placed on the package-securing string or cord and as readily removed and which when once in place may not be accidentally detached therefrom.

The invention comprises, essentially, a tubular handle having a transverse groove on one side thereof communicating with the passage of the tube, and slots in the wall of the tube extending from the ends of the transverse groove to the opposite ends of the tube.

The invention consists of certain parts and details, as will be fully described hereinafter, specifically designated in the claims, and which are illustrated in the accompanying drawings, in which—

Figure 1 is a perspective of the package-carrier. Fig. 2 is a section on the line 2 2 of Fig. 1. Fig. 3 is a section on the line 3 3 of Fig. 1. Fig. 4 is a plan of a modification of the package-carrier. Fig. 5 is a section on the line 5 5 of Fig. 4. Fig. 6 is a side elevation of the form illustrated in Fig. 4, the handle being shown upside down. Fig. 7 is a section on the line 7 7 of Fig. 6. Fig. 8 is a section on the line 8 8 of Fig. 6. Fig. 9 is a side elevation of the modified form right side up or in position to be applied to a package-securing cord. Fig. 10 is an end view of the handle shown in Fig 9. Fig. 11 is a section on the line 11 11 of Fig. 9. Fig. 12 is a side elevation of a further modification of the package-carrier. Fig. 13 is a section on the line 13 13 of Fig. 12. Fig. 14 is a section on the line 14 14 of Fig. 12, and Fig. 15 is a section on the line 15 15 of Fig. 12.

The invention is susceptible of embodiment in various forms, some of which are shown in the accompanying drawings.

Referring to Figs. 1, 2, and 3, $15^c$ designates a tubular handle, which is preferably made of wood and provided with a transverse diagonal groove 17, cut on one side of the tube and communicating with the passage 16 of the same. Extending from the ends of the diagonal groove 17 to the opposite ends of the handle $15^c$ are slots 18 19, which pass through the wall of the tube. The slots 18 19 are shown in Fig. 1 as inclined or spiral and as terminating at alined points at the ends of the handle and also with the spiral or inclination thereof as winding in the same direction. However, instead of being spiral they may be straight or parallel with the longitudinal axis of the handle, as seen in Figs. 6 and 9, and the groove 17 instead of being diagonal may cross the handle at a right angle thereto, it not being material in any of the modifications whether the transverse groove be at a right angle or diagonal as to the handle.

In the modification illustrated in Figs. 4 to 10, inclusive, $15^a$ designates the handle, $17^a$ the transverse groove communicating with the passage $16^a$ of the tube, and $18^a$ and $19^a$ the slots passing from the ends of the transverse groove to the ends of the tube. As herein shown, the slots $18^a$ and $19^a$ are straight and in a plane common to both.

As a precautionary measure to insure the retention of the handle on the package-securing string the ends of the handle may be provided with grooved lugs $21^a$. These lugs are provided by cutting a right-angle slot 20 21 from each end of the handle, the inner ends of the slots being extended toward each other in parallel planes, so that the lugs $21^a$ are alined, and the walls of the inner ends of said slots are inclined outwardly toward the end of the handle adjacent thereto, as shown in Fig. 11. The under faces of the lugs $21^a$ are preferably grooved, as shown, for the reception of the cord when the handle is applied thereto, as will be explained hereinafter.

In the modification illustrated in Figs. 12 and 13, in which $15^b$ designates the handle, and $17^b$ the transverse groove cut in one side thereof, the slots 22 23 extend from the ends of the transverse groove and terminate at the opposite ends of the handle at opposite sides thereof. This will be readily seen on viewing Fig. 13, each of the said slots passing from an end of the transverse slot, then cutting across the handle through the diagonal groove 25 to the opposite side of the tube, and finally terminating at the end of the handle in a plane common with the bottom of the transverse groove 17$^b$.

The carrier shown in Fig. 12 is provided with a groove 24 at each end of the handle, at the under side thereof, through which the package-securing cord passes when the handle is applied thereto, and each of the forms illustrated may be provided with either the said grooves, as shown in Figs. 12 and 13, or with the lugs 21$^a$, (shown in the modification illustrated in Fig. 6,) but not both, and I do not regard either as essential.

In applying the handle shown in the forms illustrated in Figs. 1 and 4 to a single string of a package the handle is slipped under the string until the latter rests in the transverse groove thereof. The handle is then turned, so that the longitudinal slots are moved toward the string, and the latter will readily pass through the slots, whether the same be straight, as shown in Fig. 6, or spiral or inclined, as shown in Fig. 1, and into the passage of the tube.

In the form illustrated in Fig. 12 in attaching the same when the handle has been turned a certain distance the securing-cord will be met by the ends of the handle beyond the diagonal-grooved portions of the slots 22 23; but owing to the curvature of the handle it will readily slip over the said ends, so as to pass through the terminations of the said slots and into the passage of the tube.

The application of the holder to the longitudinal and transverse securing-cords of a package is substantially the same as heretofore described in connection with a single cord, it being necessary only to slide the holder under the cords, so that the knot or crossing of the cords will rest in the transverse or diagonal groove. Then turn the handle so that the side slots will be moved toward the stretches of the cord adjacent thereto and which will then slip through the slots, the other cord passing through the transverse groove. When applied, the handle cannot become detached from the package-securing cord or string except by a manipulation reverse to that just described, so that accidental displacement thereof is almost impossible.

If the retaining-lugs shown in Fig. 6 are employed, by giving the handle a slight turn the package-securing cord will slip into the slots 20 and under the lugs, the cord passing through the grooves in the same.

I claim as my invention—

1. A package-carrier comprising a tubular handle having a transverse groove on one side thereof communicating with the passage of the tube, and slots in the wall of the tube extending from the ends of the transverse groove to the opposite ends of the tube.

2. A package-carrier comprising a tubular handle having a transverse groove on one side thereof communicating with the passage of the tube, and inclined slots in the wall of the tube extending from the ends of the transverse groove to the opposite ends of the tube.

3. A package-carrier comprising a tubular handle having a transverse groove on one side thereof communicating with the passage of the tube, and spiral slots in the wall of the tube extending from the ends of the transverse groove to the opposite ends of the tube.

4. A package-carrier comprising a tubular handle having a diagonal groove on one side thereof communicating with the passage of the tube, and spiral slots in the wall of the tube extending from the ends of the transverse groove to the opposite ends of the handle, the said slots being spiraled in the same direction.

5. A package-carrier comprising a tubular handle having a transverse groove on one side thereof communicating with the passage of the tube, slots in the wall of the tube extending from the ends of the transverse groove to the opposite ends of the tube, and a right-angle slot at each end of the tube on the under side thereof and providing a lug, the said lug being grooved.

EDGAR J. STEWART.

Witnesses:
ARTHUR B. SEIBOLD,
LOUIS K. GILLSON.